United States Patent
Helmick et al.

(10) Patent No.: US 10,189,160 B2
(45) Date of Patent: Jan. 29, 2019

(54) SYSTEMS AND METHODS FOR AUTOMATICALLY INSERTING COMPONENTS INTO AN ELECTRICAL CONNECTOR

(71) Applicant: THE BOEING COMPANY, Chicago, IL (US)

(72) Inventors: Eerik Helmick, Seattle, WA (US); Nick Shadbeh Evans, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 15/149,745

(22) Filed: May 9, 2016

(65) Prior Publication Data

US 2017/0320213 A1     Nov. 9, 2017

(51) Int. Cl.
| | |
|---|---|
| *B25J 9/16* | (2006.01) |
| *H01R 13/52* | (2006.01) |
| *H01R 43/00* | (2006.01) |
| *H01R 43/20* | (2006.01) |

(52) U.S. Cl.
CPC .......... *B25J 9/1687* (2013.01); *B25J 9/1697* (2013.01); *H01R 13/5208* (2013.01); *H01R 13/5221* (2013.01); *H01R 43/005* (2013.01); *H01R 43/20* (2013.01); *G05B 2219/40032* (2013.01); *Y10S 901/09* (2013.01); *Y10S 901/47* (2013.01)

(58) Field of Classification Search
CPC .............. B25J 9/1687; B25J 9/1697; G05B 2219/40032; Y10S 901/09; Y10S 901/47
See application file for complete search history.

(56) References Cited

U.S. PATENT DOCUMENTS

| | | | | |
|---|---|---|---|---|
| 4,787,138 | A * | 11/1988 | Eaton | H01R 43/20 29/748 |
| 5,727,312 | A * | 3/1998 | Maejima | H01R 43/20 29/33 M |

(Continued)

FOREIGN PATENT DOCUMENTS

WO    WO 2014/046920    3/2014

OTHER PUBLICATIONS

Extended European Search Report for EP 17159015.1-1801, dated Sep. 15, 2017.

*Primary Examiner* — Yuhui R Pan
(74) *Attorney, Agent, or Firm* — Joseph M. Butscher; The Small Patent Law Group, LLC

(57) ABSTRACT

Automated assembly systems and methods are configured to automatically insert components into grommets. The systems include a component insertion sub-system configured to insert first components into first cavities of a first grommet, an imaging sub-system configured to acquire images of the first grommet, and a grommet shift determination sub-system in communication with the component insertion sub-system and the imaging sub-system. The grommet shift determination sub-system is configured to compare at least two images of the first grommet acquired by the imaging sub-system to determine distance changes between the first cavities in response to one or more of the first components being inserted into one or more of the first cavities, and generate an insertion map that accounts for the distance changes.

21 Claims, 6 Drawing Sheets

(56) References Cited

U.S. PATENT DOCUMENTS

| | | | |
|---|---|---|---|
| 2011/0001630 A1* | 1/2011 | Stollberg | H01R 43/28 340/687 |
| 2011/0224693 A1 | 9/2011 | Bodduluri | |
| 2013/0147944 A1* | 6/2013 | Zhang | B25J 9/1661 348/95 |

* cited by examiner

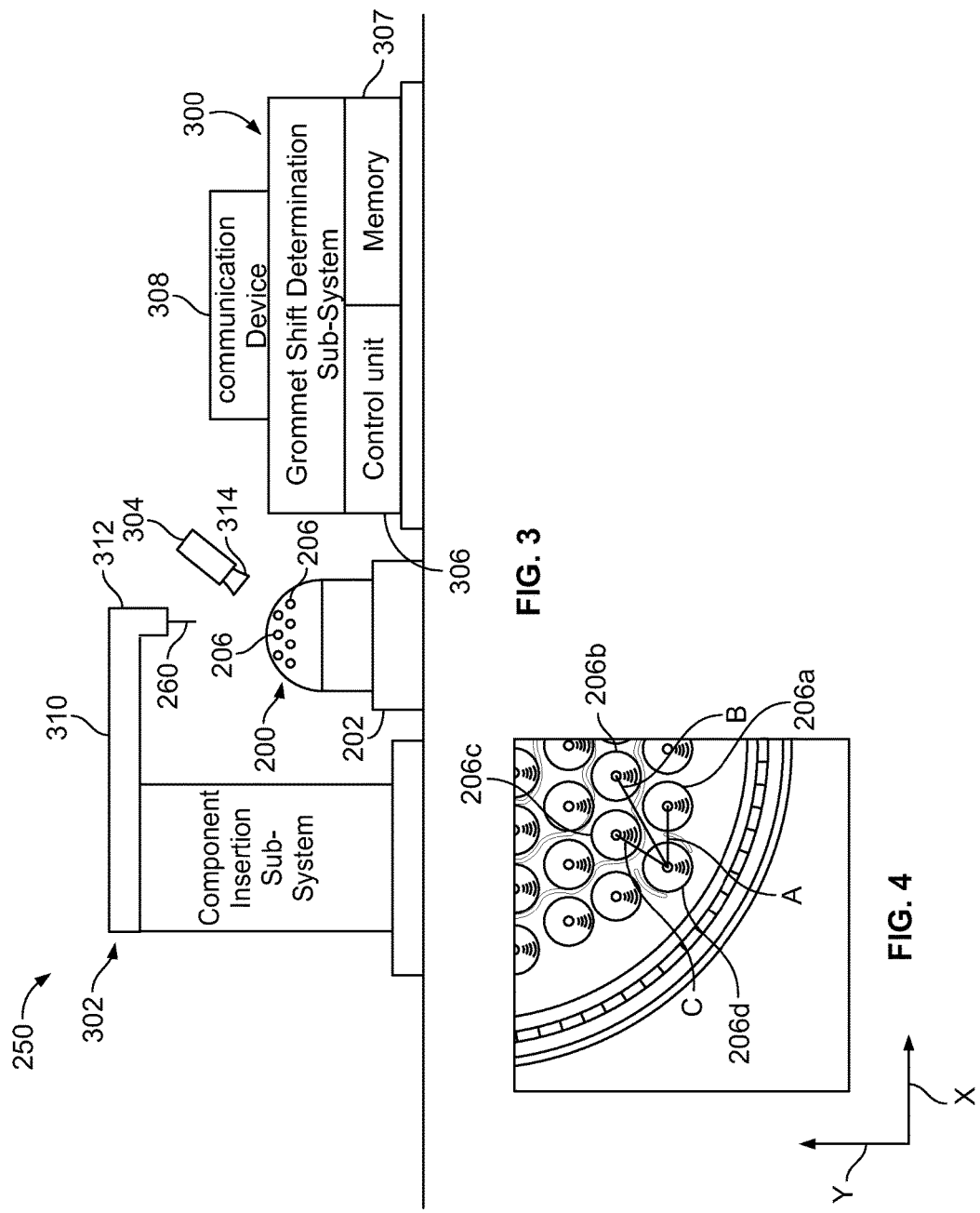

SYSTEMS AND METHODS FOR AUTOMATICALLY INSERTING COMPONENTS INTO AN ELECTRICAL CONNECTOR

FIELD OF THE DISCLOSURE

Embodiments of the present disclosure generally relate to systems and methods for assembling an electrical connector, and, more particularly, to systems and methods for automatically and accurately inserting components, such as wires, into an electrical connector during an assembly process.

BACKGROUND OF THE DISCLOSURE

Automated systems are used to assemble a variety of devices and structures. One type of system may include multiple robotic systems that are used to form an electrical connector, including a shell, a grommet, and electrical wires. For example, a robotic system may include an arm with an operative end that securely and precisely connects electrical wires to a grommet that connects to a shell. Electrical wires have contacts at terminal ends. A wire tip may be fed through the grommet and engage retention clips in a dielectric beneath a grommet, for example.

The grommet typically includes a plurality of cavities that are configured to receive and retain components, such as the wires, seal plugs, and/or the like depending on a desired, predetermined electrical connection plug map. As each component is inserted into a cavity, the grommet moves such that other cavities shift. For example, as a wire is inserted into a first cavity of the grommet, adjacent cavities neighboring the first cavity radially shift outward. As additional components are inserted into the remaining cavities, the grommet continues to shift such that the cavities of the grommet move away from their original specified locations. Consequently, as additional components are inserted into the cavities, the insertion positions may deviate from intended target destinations. The shifting of the cavities of the grommet may increase with increased insertion of components into the grommet. As a result, electrical wires of an assembled electrical connector may not be accurately positioned, and the formed electrical connector may need to be reassembled, reconfigured, or even discarded.

In known systems, positions of cavities in a grommet are mapped and delivered to a robot prior to insertion of the wires. Due to the shifting of the cavities during the wire insertion process, the robot may not position wires into the cavities as originally envisioned. In short, the robot positioning the wires is typically unable to account for position changes of the cavities, as those positions are mapped prior to the robot inserting the wires.

SUMMARY OF THE DISCLOSURE

A need exists for a system and method for permitting a robot to accurately insert components into a grommet of an electrical connector. A need exists for a system and method of compensating for grommet shift during an assembly process.

With those needs in mind, certain embodiments of the present disclosure provide an automated assembly system that is configured to automatically insert components into grommets. The automated assembly system includes a component insertion sub-system that is configured to insert first components into first cavities of a first grommet. An imaging sub-system is configured to acquire images of the first grommet. A grommet shift determination sub-system is in communication with the component insertion sub-system and the imaging sub-system. The grommet shift determination sub-system is configured to compare at least two images of the first grommet acquired by the imaging sub-system to determine distance changes between the first cavities in response to one or more of the first components being inserted into the first cavities. The grommet shift determination sub-system is configured to generate an insertion map that accounts for the distance changes. The component insertion sub-system may be further configured to insert subsequent components into subsequent cavities of subsequent grommets based on the insertion map.

The grommet shift determination sub-system may generate the insertion map by modifying an initial insertion map that indicates a desired component configuration for the first grommet. The two images may include an initial image of the first grommet devoid of any of the first components.

In at least one embodiment, the grommet shift determination sub-system is configured to compound distance changes between the first cavities in response to each of the first components being inserted into a respective one of the first cavities. The grommet shift determination sub-system may then generate the insertion map based on the compounded distance changes.

The grommet shift determination sub-system may be configured to determine the distance changes between all of the first cavities in response to each of the first components being inserted into a respective one the first cavities. In at least one other embodiment, the grommet shift determination sub-system is configured to determine the distance changes between a subset of the first cavities in response to each of the first components being inserted into a respective one the first cavities.

The imaging sub-system may be configured to acquire a separate image after each of the first components is inserted into a respective one of the first cavities. The grommet shift determination sub-system may be configured to compare each of the separate images with respect to at least one other of the separate images to determine the distance changes between the first cavities in response to the first components being inserted into the first cavities.

In at least one embodiment, the grommet shift determination sub-system is configured to generate the insertion map based on a multivariate regression model. The grommet shift determination sub-system may be configured to receive standard data regarding the first grommet and configuration data regarding the first grommet. The grommet shift determination sub-system may also be configured to receive experimental data including the images for each of the first cavities. The grommet shift determination sub-system may also be configured to analyze the standard data, the configuration data, and the experimental data to generate map data for the first cavities, and generate the insertion map for all of the first cavities based on the map data. The standard data may include a number of first cavities. The configuration data may include information regarding one or more of a material that forms the first grommet, a durometer of the first grommet, and/or sizes and locations of the first cavities.

Certain embodiments of the present disclosure provide a method of automatically inserting components into grommets. The method includes inserting first components into first cavities of a first grommet, acquiring images of the first grommet with an imaging sub-system, comparing at least two of the acquired images of the first grommet with a grommet shift determination sub-system, determining, via the comparing by the grommet shift determination subsystem, distance changes between the first cavities in response to the first components being inserted into the first cavities, and generating, using the grommet shift determination sub-system, an insertion map that accounts for the distance changes.

Certain embodiments of the present disclosure provide an automated assembly system that is configured to automatically insert components into grommets. The automated assembly system includes a component insertion sub-system configured to insert first components into first cavities of a first grommet, and a grommet shift determination sub-system in communication with the component insertion sub-system. The grommet shift determination sub-system is configured to generate an insertion map that accounts for distance changes between the first cavities as the first components are inserted into the first cavities. The component insertion sub-system is further configured to insert subsequent components into subsequent cavities of subsequent grommets based on the insertion map.

BRIEF DESCRIPTION OF THE DRAWINGS

FIG. 3 is a schematic diagrammatic representation of an automated assembly system that is configured to automatically insert components into a grommet, according to an embodiment of the present disclosure.

FIG. 4 is a diagrammatic representation of a portion of a top view of a grommet having empty cavities that surround a cavity retaining a component, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods of compensating for grommet shift as components are inserted therein. The systems and methods are used to predict where cavities of the grommet will shift based on insertion of components (such as wires and seal plugs) into the cavities. The predicted cavity locations are stored as an insertion map that is used by an automated system (such as a robotic system) to insert components into a grommet.

Certain embodiments of the present disclosure provide systems and methods that use a predictive method that maps X-Y coordinate shifts in cavities in a connector grommet due to insertion of components (such as wires) during an automated assembly process.

Figure 1A:
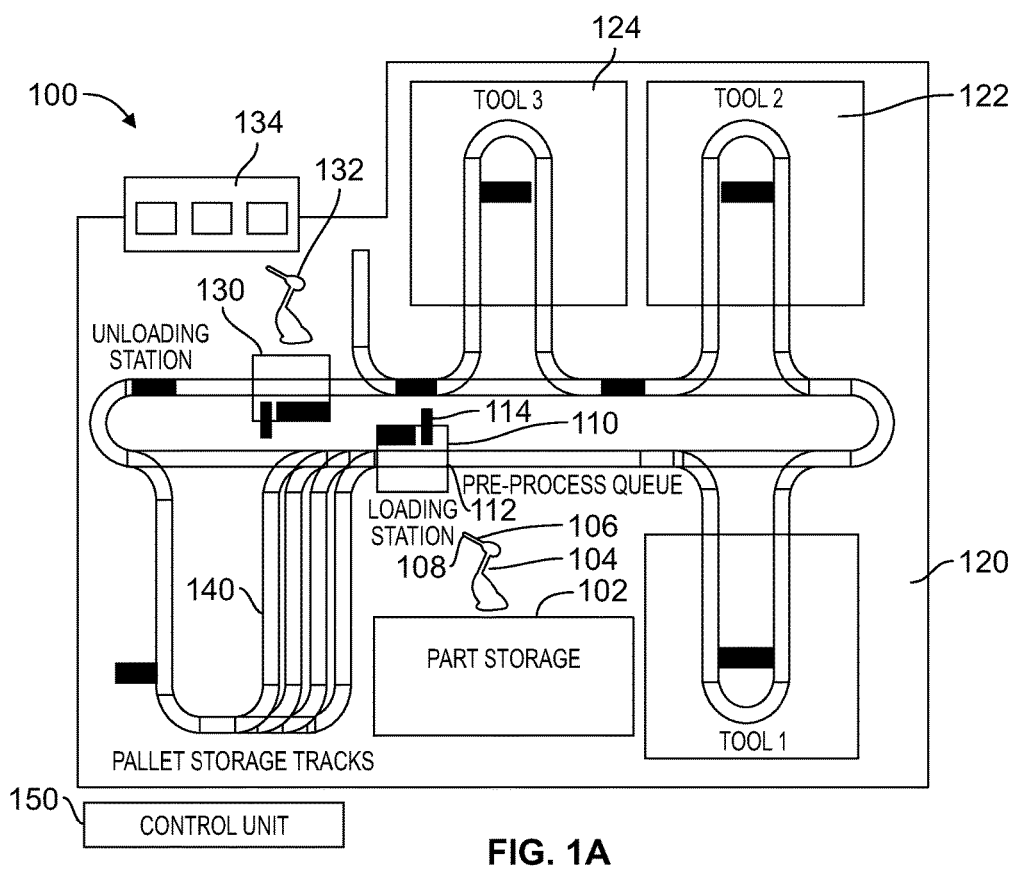
FIG. 1A is a schematic diagrammatic representation of an assembling system for an electrical connector, according to an embodiment of the present disclosure.

FIG. 1A is a schematic diagrammatic representation of a system 100 for assembling an electrical connector, according to an embodiment of the present disclosure. The system 100 may include a part storage pen 102, which may contain multiple electrical mating connectors. Each mating connector may include a shell and a grommet secured thereto. The system 100 may be configured to convey the mating connector between various assembling stations to secure additional components to the mating connector to form the electrical connector. That is, a fully-formed electrical connector includes the mating connector and one or more components secured thereto, such as conductive wires, contact terminals, seals, and the like. The system 100 may be used to automatically insert wires into a grommet.

An engaging robot 104 having an arm 106 and an end effector 108 is configured to grasp a particular mating connector from the part storage pen 102 and transfer the mating connector to a loading station 110, which may be disposed along a conveyor 112. The conveyor 112 (such as a moving conveyor line, track, or the like) may moveably support a pallet (not shown in FIG. 1A). A connector support assembly (not shown in FIG. 1A) may be supported on the pallet. As such, the pallet may moveably secure the connector support assembly on the conveyor 112. A grommet (not shown in FIG. 1A) may be supported on the connector support assembly.

The engaging robot 104 is configured to securely position the mating connector onto the connector support assembly. In order to properly position and orient the mating connector onto the connector support assembly, a feature recognition system 114 (such as a laser, infrared, visual, photogrammetry, or the like system) may be used to detect one or more features of the mating connector and one or more features of the connector support assembly. The engaging robot 104 may be in communication with the feature recognition system 114 and properly aligns the mating connector with the connector support assembly based on a comparison of the detected features. For example, the feature recognition system 114 may visually detect a mark, protuberance, hole, channel, or the like on the mating connector and a mark, protuberance, hole, channel, or the like on a portion of the connector support assembly. The feature recognition system 114 and/or a control unit (either within the feature recognition system, or in communication with the feature recognition system) may include hardware and software that is programmed to determine a proper relationship between the detected feature(s) of the mating connector with the detected feature(s) of the connector support assembly. The engaging robot 104 may then move the mating connector relative to the connector support assembly so that the detected features are properly aligned with respect to one another. The engaging robot 104 may then secure the mating connector to the connector support assembly in the proper position and orientation, such as through a press fit.

In at least one particular, non-limiting embodiment, the feature recognition system 114 may be positioned over a grommet of a mating connector and acquire an image of the mating connector. The feature recognition system 114 may process the image to determine a position and orientation of a particular feature of the grommet, such as a line on an outer surface thereof. The feature recognition system 114 may then determine a proper alignment of the line for one or more assembling stages of the mating connector. The feature recognition system 114, which may be in communication with the engaging robot 104, directs the engaging robot 104 to move the mating connector to the proper alignment. The feature recognition system 114 may then detect one or more features of a base of the connector support assembly, such as holes that are used to align and secure the base to a pallet. The feature recognition system 114 may then determine an offset between the line of the mating connector and the holes of the base. The feature recognition system 114 determines the difference between the offset and a proper orientation of the line of the mating connector with the holes. The feature recognition system 114 may then direct the engaging robot 104 to move the mating connector in relation to the connector support assembly so that the line is in a determined proper relationship with the holes. The engaging robot 104 then operates the end effector 108 to secure (such as through a press fit) the mating connector to a connection interface of a shell that is secured to the base of the connector support assembly.

After the mating connector is positioned on the connector support assembly at a proper, preserved orientation, the engaging robot 104 disengages the mating connector. The connector support assembly may then be positioned on a pallet, which may then be conveyed to an assembling station by way of the conveyor 112. Optionally, the base of the connector support assembly may be initially secured to the pallet, and the engaging robot 104 may align and secure the insert to the base secured to the pallet.

After the mating connector is secured to the connector support assembly, the pallet, on which the connector support assembly may be positioned, may be conveyed to various assembling tools 120, 122, and 124 on the conveyor 112. The tools 120, 122, and 124 may be used to secure various components to the mating connector to form an electrical connector. For example, the tool 120 may be or include a component insertion sub-system that is configured to secure conductive wires to a grommet of the mating connector. The tool 120 may be or otherwise include an automated assembly device, such as a robot. The tool 122 may position a seal around a portion of the mating connector. The tool 124 may position a mating interface on an end of the mating connector. More or less tools 120, 122, and 124 and stations than shown may be used.

After the electrical connector is formed through operation of the tools 120, 122, and 124, the electrical connector may be conveyed on the conveyor 112 (via the connector support assembly supported on a pallet) to an unloading station 130. An engaging robot 132 is used to remove the electrical connector from the connector support assembly. The engaging robot 132 may then transfer the formed electrical connector to a connector storage structure 134, such as a shelf, bucket, trough, or the like. The pallet and connector support assembly are then conveyed to pallet storage tracks 140 which connect to the loading station 110.

A control unit 150 may be in communication with the engaging robots 104 and 132, the feature recognition system 114, as well as the various tools 120, 122, and 124. For example, the control unit 150 may be in communication with the components through wired and/or wireless connections. The control unit 150 may be configured to control operation of the assembling system and method. For example, the control unit 150 may be configured to control operation of each of the components, including the feature recognition system 114, and the engaging robots 104 and 132. Optionally, each of the engaging robots 104 and 132 and the feature recognition system 114 may include a separate and distinct control unit. The control unit 150 (or each control unit) may include hardware and software that stores programs that are used to control operation of the various components of the system 100.

Figure 1B:
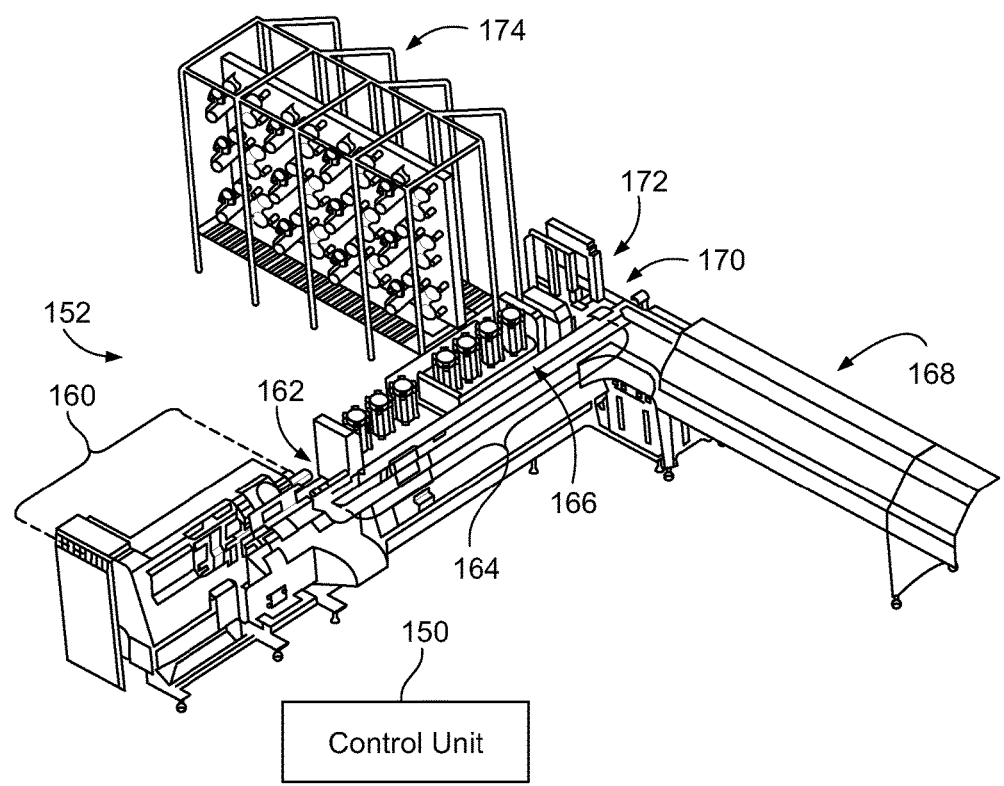
FIG. 1B is a diagrammatic representation of a top view of an assembling system for an electrical connector, according to an embodiment of the present disclosure.

FIG. 1B is a diagrammatic representation of a top view of an assembling system 152 for an electrical connector, according to an embodiment of the present disclosure. The assembling system 152 includes a wire processing and insertion tool 160 that may be connected to and/or include a wire bundling station 162 and one or more wire processing modules 164 on a rail 166. The system 152 may also include a wire feed device 170, a laser wire marker 172, and a de-reeler assembly 174. The assembling system 152 is configured to automatically insert wires, plugs, and/or other components into a grommet. A control unit 150 may be in communication with the various portions of the system 152 and configured to control operation thereof.

Figure 2:
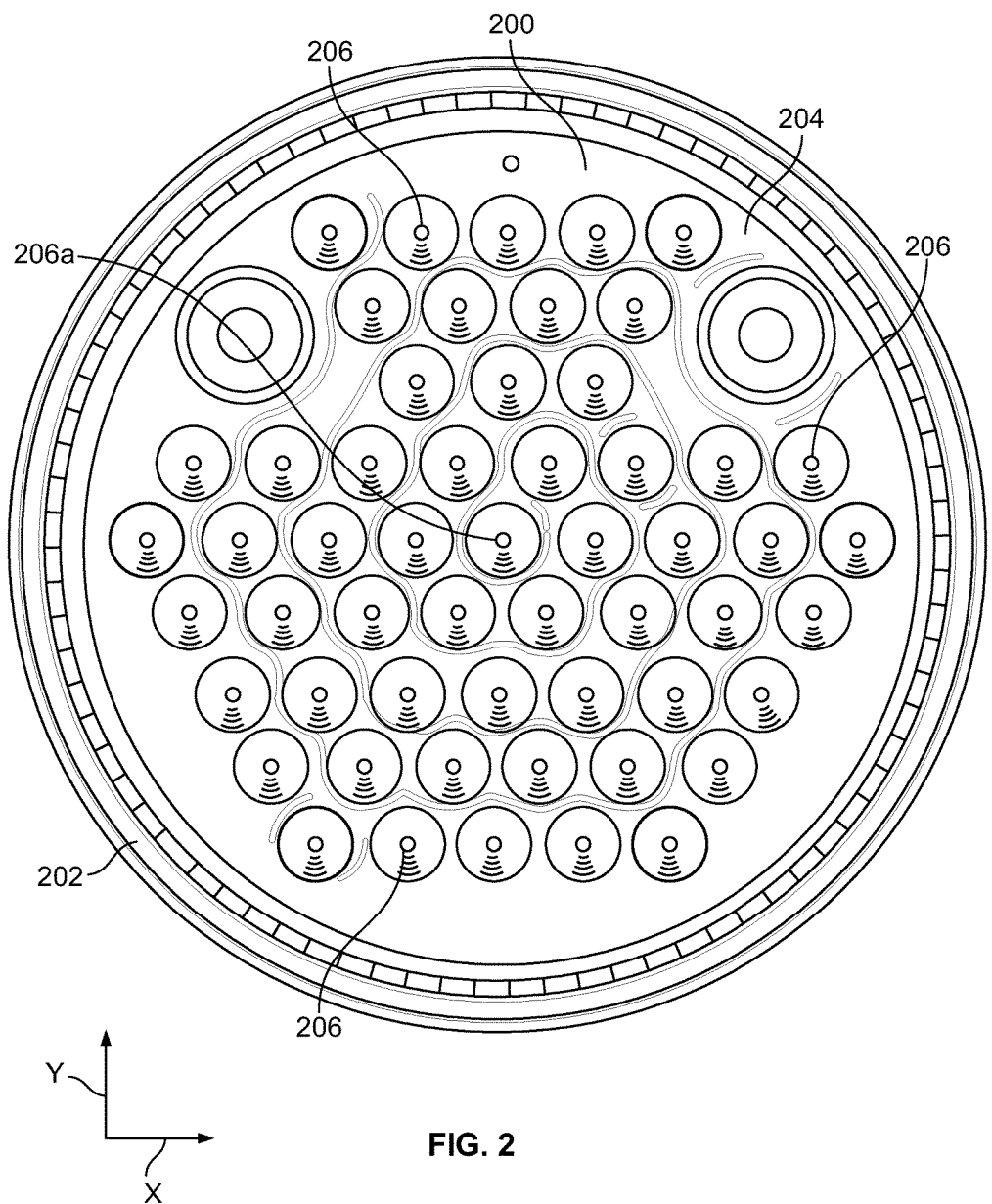
FIG. 2 is a diagrammatic representation of a top view of a grommet supported on a connector support assembly, according to an embodiment of the present disclosure.

FIG. 2 is a diagrammatic representation of a top view of grommet 200 supported on a connector support assembly 202, according to an embodiment of the present disclosure. The grommet 200 includes a main body 204 having a plurality of cavities 206 formed therethrough or therein. The grommet 200 is formed of a compliant material, such as rubber, plastic, and/or the like. Each cavity 206 is configured to receive and retain a component, such as a wire or seal plug. A component insertion sub-system (not shown in FIG. 2), such as a robotic tool or assembly, is configured to insert the components into the cavities 206 based on a insertion map, which indicates the position of each component with respect to a particular target cavity 206. The insertion map may indicate the position of each component with respect to an X-Y coordinate frame or map of the grommet 200. For example, a center cavity 206a may be at the origin of an X-Y coordinate insertion map. Optionally, the origin of the X-Y coordinate insertion map may be at various other locations in relation to the grommet 200.

The grommet 200 may include more or less cavities 206 than shown. For example, the grommet 200 may include between ten and four hundred cavities 206. Optionally, the grommet 200 may include less than ten cavities 206, or more than four hundred cavities 206.

Referring to FIGS. 1 and 2, the connector support assembly 202 that supports the grommet 200 may be positioned on a pallet (not shown) that is moveably retained by the conveyor 112. As such, the connector support assembly 202 may be conveyed on the conveyor 112 by the pallet. In at least one other embodiment, the conveyor 112 may be configured to moveably retain at least a portion of the connector support assembly 202, instead of using a separate pallet.

FIG. 3 is a schematic diagrammatic representation of an automated assembly system 250 that is configured to automatically insert components 260 into the grommet 200, according to an embodiment of the present disclosure. The automated assembly system 250 includes a grommet shift determination sub-system 300 in communication with a component insertion sub-system 302. The grommet shift determination sub-system 300 may also be in communication with an imaging sub-system 304. The component insertion sub-system 302 is configured to automatically insert the components 260 into the grommet 200 based on an insertion map determined by the grommet shift determination sub-system 300. The grommet shift determination sub-system 300 may receive an initial insertion map, and modify the initial insertion map to generate an insertion map (for example, a final, revised, or modified insertion map) that compensates for grommet shift during an automated assembly process, as described below.

The grommet shift determination sub-system 300 includes a control unit 306, which includes or is otherwise in communication with a memory 307 through one or more wired or wireless connections. The control unit 306 may be part of the control unit 150 (shown in FIG. 1A and FIG. 1B). In at least one other embodiment, the control unit 306 is the control unit 150. In at least one other embodiment, the control unit 306 is separate and distinct from the control unit 150. The control unit 306 may also be in communication with a communication device 308, such as an input/output port, an Ethernet port, a modem, a wireless transceiver, an antenna, and/or the like.

The component insertion sub-system 302 may be a robotic tool, device, assembly, and/or the like that is configured to automatically insert the components 260 into the cavities 206 of the grommet 200. For example, the tool 120 of FIG. 1A may be or otherwise include the component insertion sub-system 302. As another example, the wire processing and insertion tool 160 of FIG. 1B may be or otherwise include the component insertion sub-system 302. The component insertion sub-system 302 may include a robotic arm 310 coupled to an end effector 312 that is configured to position the components 260 into the cavities 206. The components 260 may be electrical wires, seal plugs, and/or the like. Optionally, the component insertion sub-system 302 may include various other structures and devices (in addition to, or in place of the arm 310 and the end effector 312) that are configured to automatically insert components into the grommet 200. The component insertion sub-system 302 is in communication with the grommet shift determination sub-system 300 (such as via the communication device 308) through one or more wired or wireless connections.

The imaging sub-system 304 includes an imaging device 314, such as a digital camera. The imaging device 314 focuses on the grommet 200 and is configured to acquire images of the grommet 200. The grommet shift determination sub-system 300 receives and analyzes the acquired images of the grommet from the imaging sub-system 304, such as through one or more wired or wireless connections.

In operation, in order to generate an insertion map that may be subsequently used to assemble components into grommets, the control unit 306 of the grommet shift determination sub-system 300 first determines desired locations of various components 260 (such as wires or seal plugs) within the cavities 206 of the grommet. For example, an initial insertion map indicating a desired component configuration of various components may be downloaded and/or otherwise stored in the memory 307. The initial insertion map may represent positions of the cavities 206 of the grommet 200 having components 260 (whether wires or seal plugs, for example) therein. As described below, the grommet shift determination sub-system 300 revises the initial insertion map to generate a final insertion map based on changing distances between neighboring cavities 206 after components 260 are inserted therein.

The imaging sub-system 304 acquires an initial image of the grommet 200 without any components inserted into the cavities 206. The grommet shift determination sub-system 300 receives the initial image from the imaging sub-system 304 and analyzes the position of the cavities 206 without any components 260 positioned therein. For example, the control unit 306 may determine the position of centers or centroids of each cavity 206 within the initial image at X-Y positions in relation to the grommet 200. The control unit 306 may store the initial positions of each cavity 206 (such as within an initial position file) in the memory 307.

Next, the component insertion sub-system 302 inserts a component 260 (such as a wire) into a cavity 206 according to the desired component configuration. For example, the desired component configuration, which may be stored in the memory 307 and/or a memory of the component insertion sub-system 302, dictates that a particular component 260 is inserted into the cavity 206.

After the first component 260 is inserted into the cavity 206, the imaging sub-system 304 acquires a subsequent image of the grommet 200, in which the component 260 is within the cavity 206. The position of the other cavities 206 of the grommet 200 may shift upon insertion of the component 260 into the cavity 206. The control unit 306 of the grommet shift determination sub-system 300 compares the subsequent image to the initial image. The control unit 306 compares the position(s) of one or more the cavities 206 in the subsequent image to the respective position(s) in the initial image. The control unit 306 determines a shift in position of the cavities 206 based on the comparison between the images. The control unit 306 then stores the shift in position within the memory.

Notably, the imaging sub-system 304 may be used during a process of generating an insertion map. After the insertion map is generated, grommets may be assembled (for example, component inserted into cavities thereof) based on the generated insertion map without further use of the imaging sub-system 304.

In at least one embodiment, the control unit 306 may generate the insertion map based on the shifted positions of the cavities determined through a comparison of the initial image and the subsequent image. For example, a neighboring cavity 206 (for example, a cavity 206 that is closest to the cavity 206 having the inserted component 260 without any other cavities 206 therebetween) may have shifted a certain radial distance after the insertion of the component 260 into the cavity 206. The grommet shift determination sub-system 300 may use the shifted distance in relation to all of the cavities 206 after components 260 are inserted therein. For example, the grommet shift determination sub-system 300 may determine that each empty cavity 206 that neighbors a cavity having a component 260 inserted therein shifts the distance as determined from a comparison of the initial image and the second image. The grommet shift determination sub-system 300 may then generate the insertion map based on such shifted distances after each insertion of a component 260. Further, the grommet shift determination sub-system 300 may determine shifted distances of each empty cavity 206 surrounding a cavity 206 having a component 260 inserted therein.

FIG. 4 is a diagrammatic representation of a portion of a top view of the grommet 200 having empty cavities 206a, 206b, 206c that surround a cavity 206d retaining a component 260, according to an embodiment of the present disclosure. As shown, the cavities 206a, 206b, and 206c each neighbor the cavity 206d, as there are no other intervening cavities between the cavity 206d and the cavities 206a, 206b, and 206c.

After the component 260 is inserted into the cavity 206d, a distance A between the centroids of the cavities 206a and 206d may increase (such as through radial expansion). Similarly, a distance B between the centroids of the cavities 206b and 206d may increase. Further, a distance C between the centroids of the cavities 206c and 206d may increase. The distances A, B, and C may increase the same or different magnitudes. Notably, the magnitude of increase of the distances A, B, and C after insertion of the component 260 into the cavity 206d for each of the distances A, B, and C may differ. For example, the distance A may increase 2%, while the distance B may increase 1.5%, and the distance C may increase 1% after insertion of the component 260 into the cavity 206d.

More or less cavities 206 may bound portions of the cavity 206d than shown. For example, the cavity 206d may be surrounded around an entire circumference by neighboring cavities 206. The distances between each of the neighboring cavities 206 and the cavity 206d may be determined.

Referring to FIGS. 3 and 4, the grommet shift determination sub-system 300 (such as via the control unit 306) determines the change in distances A, B, and C by comparing the initial image to the second image. Based on the determined change in distances A, B, and C, the grommet shift determination sub-system 300 may revise an initial insertion map to reflect the changed distances A, B, and C. The grommet shift determination sub-system 300 may revise the insertion map for the cavities 206 based on the changed distances. For example, the grommet shift determination sub-system 300 may revise distances in relation to all or a subset of cavities 206 based on the changed distances as determined from the initial image and the subsequent image. In at least one embodiment, the distances between each cavity 206 of the grommet 200 may be adjusted based on the determined shift in distances A, B, and C.

In at least one embodiment, the grommet shift determination sub-system 300 may iteratively modify or otherwise revise the insertion map. For example, after the grommet shift determination sub-system 300 revises the insertion map based on the shifted distances A, B, and C after the component 260 is inserted into the cavity 206d, the grommet shift determination sub-system 300 may then determine shifted distances between neighboring components after a component is inserted into the cavity 206a. The grommet shift determination sub-system 300 may iteratively repeat the insertion map revision process with respect to inserted components into each and every cavity 206 formed in the grommet 200.

In at least one other embodiment, the grommet shift determination sub-system 300 may revise the insertion map based on components being inserted into less than all (for example, a subset) of the cavities 206. For example, the grommet shift determination sub-system 300 may revise the insertion map based on the changed distances between neighboring cavities 206 as determined from a comparison of the initial or prior image and the subsequent image after each component insertion, every second component insertion (that is, skipping one component insertion), every third component insertion (that is, skipping two component insertions), or every nth component insertion.

As noted, the grommet shift determination sub-system 300 may revise (either one time, or iteratively) the insertion map based on changed distances between neighboring cavities 206 of the grommet 200 determined from the initial image and the second image. The grommet shift determination sub-system 300 may apply the changed distances for each subsequent insertion of a component.

In at least one other embodiment, after each insertion of a component 260 into a particular cavity 206 of the grommet 200, the imaging sub-system 304 may acquire an image of the grommet 200. The grommet shift determination sub-system 300 then compares the subsequent image to the previous image to determine the changed distances between neighboring cavities 206, and then revises the initial insertion map accordingly.

The grommet shift determination sub-system 300 revises the initial insertion map based on changing positions of cavities 206 of the grommet 200 during a component insertion process to generate a modified insertion map that reflects the changed distances. The modified insertion map may be generated based on a comparison of changed distances between an initial or prior image(s) and one or more subsequent image(s). In at least one embodiment, the modified insertion map may be generated based on comparison of an image of the grommet and a prior or previous image (such as an immediately previous image) after each component is inserted into a respective cavity. The grommet shift determination sub-system 300 may iteratively repeat such comparison for each component insertion into a respective cavity 206 until all of the cavities 206 are filled with a component 260.

After the grommet shift determination sub-system 300 determines the modified insertion map, the component insertion sub-system 302 then inserts components 260 into subsequent grommets 200 according to the modified insertion map. For example, the initial grommet 200 that is imaged and used to determine the modified insertion map may be a test or calibration grommet 200. The component insertion sub-system 302 efficiently inserts the components 260 into the grommet 200 according to the modified insertion map without the need for continued operation of the imaging sub-system 304. That is, once a modified insertion map is generated based on insertion of components 260 into a first grommet 200 (such as a test or calibration grommet 200), the grommet shift determination sub-system 300 may not generate a modified insertion map for each subsequent grommet. Instead, the modified insertion map generated by the grommet shift determination sub-system 300 may be used to insert components 260 into each subsequent grommet 200.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The control unit 306, for example, is configured to execute a set of instructions that are stored in one or more storage elements (such as one or more memories), in order to process data. For example, the control unit 306 may include or be coupled to one or more memories (such as the memory 307). The storage elements may also store data or other information as desired or needed. The storage elements may be in the form of an information source or a physical memory element within a processing machine.

The set of instructions may include various commands that instruct the control unit 306 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, in response to results of previous processing, or in response to a request made by another processing machine.

The diagrams of embodiments herein may illustrate one or more control or processing units, such as the control unit 150 (shown in FIG. 1A and FIG. 1B) and the control unit 306 (shown in FIG. 3). It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figures 5A, 5B:
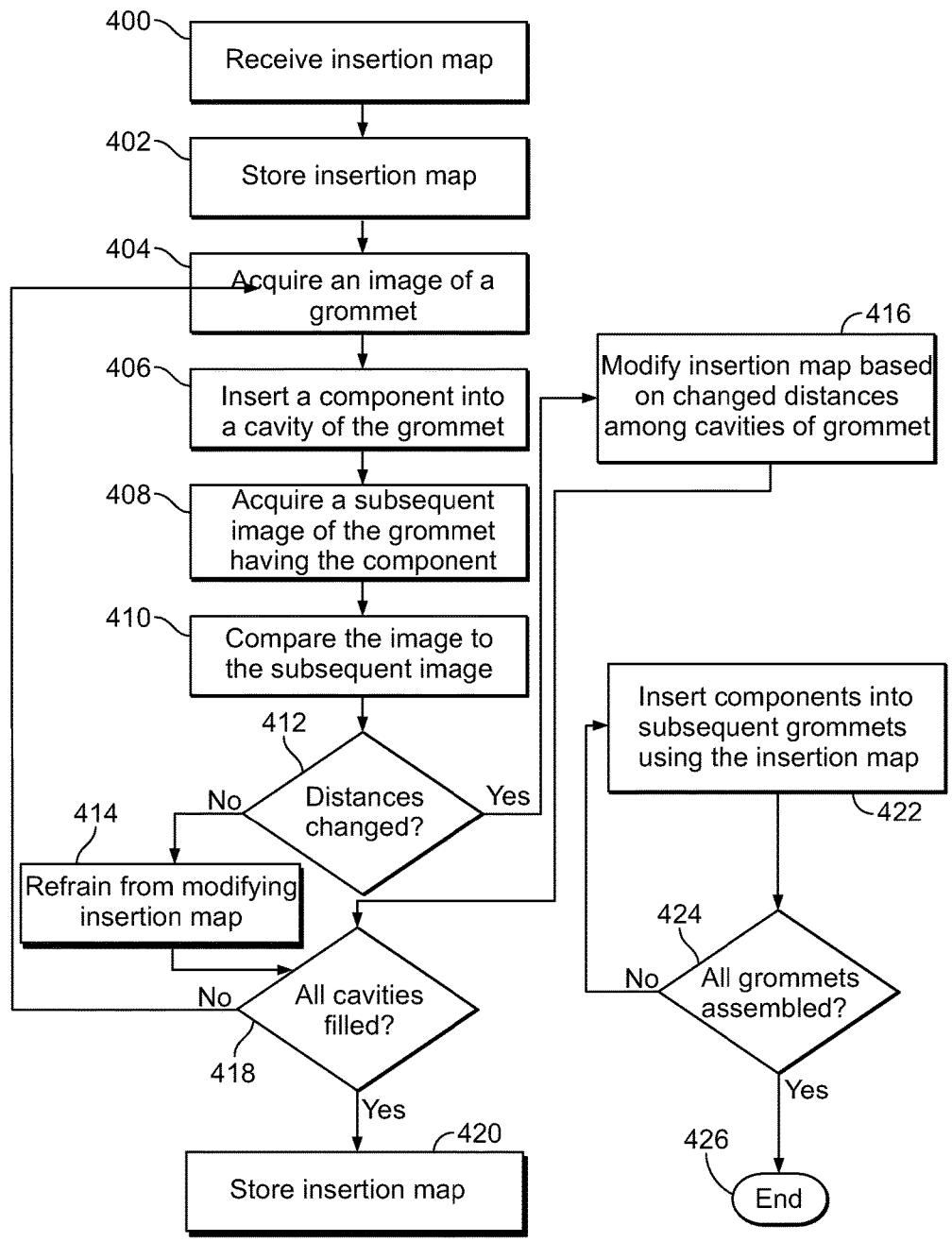
FIG. 5A illustrates a flow chart of a method of generating an insertion map for a grommet of an electrical connector, according to an embodiment of the present disclosure.
FIG. 5B illustrates a flow chart of a method of accurately inserting components into a grommet of an electrical connector, according to an embodiment of the present disclosure.

FIG. 5A illustrates a flow chart of a method of generating an insertion map for a grommet of an electrical connector, according to an embodiment of the present disclosure. Referring to FIGS. 3 and 5A, the method begins at 400, in which an initial insertion map (such as a factory specification insertion map) is received. For example, an insertion map indicating desired positions of various components within cavities 206 of a grommet 200 may be received by the grommet shift determination sub-system 300. In at least one embodiment, the insertion map may be sent to the grommet shift determination sub-system 300 through one or more wired or wireless connections.

At 402, the insertion map is stored. For example, the control unit 306 of the grommet shift determination sub-system 300 may store the insertion map within the memory 307.

At 404, an image of an initial or first grommet 200 (such as a test or calibration grommet) is acquired. For example, the imaging sub-system 304 may acquire the image, which is then received by the grommet shift determination sub-system 300. The control unit 306 may store the image within the memory 307. An initial image of the grommet 200 includes no components within the cavities 206 thereof. Optionally, the initial image may include at least one component (such as a seal plug) inserted into at least one cavity 206.

Next, at 406, a component 260 is inserted into a cavity 206 of the grommet 200. For example, the component insertion sub-system 302 may insert the component 260 into the cavity 206 based on the initially-received insertion map.

Subsequent to the component 260 being inserted into the cavity 206, a subsequent image of the grommet 200 is acquired at 408. For example, the imaging sub-system 304 acquires the subsequent image, which is then received by the grommet shift determination sub-system 300, and which may be stored in the memory 307.

At 410, the image and the subsequent image are compared at 410. For example, the control unit 306 of the grommet shift determination sub-system 300 may gain access to the image and the subsequent image stored in the memory 307, and compare the images.

At 412, it is determined whether distances between or otherwise among two or more cavities 206 of the grommet 200 have changed. For example, the control unit 306 determines whether the distances (such as X and Y distances in relation to an X-Y coordinate frame map of the grommet 200) between the cavities 206 have changed. If the distances have not changed, the control unit 306 refrains from modifying the insertion map at 414. For example, the control unit 306 may refer to an established percentage shift threshold stored within the memory 307. The threshold may be a predetermined insignificant shift below which the control unit 306 refrains from modifying the insertion map.

If, however, the distances have changed at 412, the method proceeds from 412 to 416, in which the insertion map is modified based on the changed distances among the cavities of the grommet. For example, the control unit 306 of the grommet shift determination sub-system 300 may modify the insertion map.

After 414 or 416, the method proceeds to 418, in which it is determined whether all cavities 206 of the grommet 200 have been filled with components 260. For example, the control unit 306 of the grommet shift determination sub-system 300 may determine whether all of the cavities 206 have been filled with components 260. If all the cavities 206 have not been filled, the method returns to 404.

If, however, all of the cavities 206 have been filled, the method proceeds from 418 to 420, in which the insertion map is stored. For example, the control unit 306 stores the insertion map (which may have been modified based on changes in distances between cavities 206) in the memory 307 and/or a memory of the component insertion sub-system 302.

FIG. 5B illustrates a flow chart of a method of accurately inserting components into a grommet of an electrical connector, according to an embodiment of the present disclosure. Referring to FIGS. 3 and 5B, at 422, components 260 are inserted into subsequent grommets 200 using the insertion map 422 that was previously generated (such as described with respect to FIG. 5A). For example, the component insertion sub-system 302 inserts components 260 into the subsequent grommets 200 based on the insertion map. In at least one embodiment, the control unit 306 may control the component insertion sub-system 302.

At 424 it is determined whether all desired grommets 200 have been assembled. For example, the control unit 306 may determine whether or not additional grommets 200 are to be assembled. If all of the grommets 200 are not assembled, the method returns to 422 from 424. If, however, all of the grommets 200 are assembled at 424, the method ends at 426.

Optionally, instead of using additional images, the method may iteratively modify the insertion map based on the magnitude of distance changes for each cavity after subsequent component insertions. For example, the distances between or otherwise among cavities may be determined from an initial image and a second image. The insertion map may be modified for each subsequent component insertion based on such distance changes. For example, after a first component is inserted, distance changes between cavities may be determined through image analysis. The distance changes may then be applied to subsequent component insertions (without acquiring additional images), such as for each and every component insertion, every second, third, fourth, or nth, insertion, and/or the like.

The control unit 306 of FIG. 3 may be used to control operation of the method shown and described with respect to FIGS. 5A and 5B. The control unit 306 may be a single control unit that is in communication with the grommet shift determination sub-system 300, the component insertion sub-system 302, and the imaging sub-system 304, or the control unit 306 may be distributed (for example, multiple control units) among the various sub-systems (for example, the grommet shift determination sub-system 300 may include a control unit that is in communication with a control unit of the component insertion sub-system 302). The control unit 306 may be programmed to operate the system 250 according to the method shown and described with respect to FIGS. 5A and 5B.

As shown in FIG. 5A, the method may refrain from modifying the insertion map at 414 if distances between cavities 206 of the grommet 200 do not change as components 260 are inserted therein. However, it has been found that the cavities 206 generally outwardly expand away from one another as components 260, such as wires and seal plugs, are inserted into the cavities 206 during the assembly process. The components 260, along with variables such as grommet stiffness, generally cause distances between the cavities 206 to change during the assembly process. The grommet shift determination sub-system 300 is configured to analyze such changes, as described above, and generate a modified insertion map. The modified insertion map may provide a theoretical map that may be applied to subsequent grommets during wire insertion, for example. In at least one embodiment, the control unit 306 of the grommet shift determination sub-system performs a step-by-step analysis with respect to a position of each empty cavity 206 prior to insertion of a component 260 into that cavity 206.

In at least one embodiment, the control unit 306 may conduct a preliminary analysis to determine the effects of inserting components 260 into cavities 206 surrounding a particular cavity 206 of interest. For example, for a given grommet 200, a single wire insertion may product a first percentage shift in the neighboring cavities 206, and a second percentage shift (that may differ from the first percentage shift) in the cavities positioned directly outside of the neighboring cavities. Instead of calculating the shift for all cavities 206 at once, the control unit 306 may compound or stack the effects of component insertion into the neighboring cavities. For example, a neighboring cavity 206 may shift 3.77%. When a wire is inserted into that particular neighboring cavity, another cavity neighboring that cavity shifts 3.77%+0.86% from the first insertion. The control unit 306 may propagate such compounding throughout the entire grommet 200 and generate an insertion map based thereon.

In at least one other embodiment, a first component 260 (such as a wire) is inserted into a location (that is, a cavity 206) specified by an initial insertion map. The control unit 306 calculates a position of a second component 260 based on the first component 260 that is (or is to be) inserted into the first cavity. The control unit 306 may then determine a position of a third cavity of the grommet 200 based on information regarding the first two cavities. Based on image analysis of a test grommet 200, for example, the control unit 306 may derive an algorithm that may be a sequential function that takes into account cavity information for cavities 1 through (n−1) for insertion into cavity n. Once the sequential function has produced the new theoretical locations of all of the cavities 206, the control unit 306 may then store the locations in a revised insertion map, which may then be used by to control the component insertion sub-system 302 to insert components 260 (such as wires) into subsequent grommets 200.

In at least one embodiment, the control unit 306 may generate the modified insertion map based on a multivariate regression model. For example, the component insertion sub-system 302 experimentally inserts components 260 into the cavities 206 of a test grommet 200. The control unit 206 analyzes images of the test grommet 200 during insertion of the components 260, and measured cavity locations between each component insertion. The control unit 206 may analyze such data (for example, the measured cavity locations during each step of the component insertion) according to a mathematical model to create a multivariate regression model. Numerous variables may be determined prior to such analysis. For example, the variables may include: initial or theoretical X positions of the cavities with respect to an X-Y coordinate system of the grommet 200, initial or theoretical Y positions of the cavities with respect to the X-Y coordinate system of the grommet 200, the types of components 260 being inserted into the cavities, a diameter of the grommet 200, a cavity distance from a support shell coupled to the grommet 200, a durometer of the grommet 200, experimentally measured (based on image analysis) X positions of the cavities with respect to the X-Y coordinate system of the grommet 200, and/or experimentally measured (based on image analysis) Y positions of the cavities with respect to the X-Y coordinate system of the grommet 200.

In at least one embodiment, the components 260 (such as wires) are inserted into the grommet one at a time. After each component insertion, the imaging sub-system 304 may acquire an image. The control unit 306 may determine (for example, measure) distances between all of the cavities 206 of the grommet 200 after each component insertion, such as through image analysis (for example, comparing two or more images of the grommet 200). Based on the measured distances between all of the cavities 206, the control unit 306 may then determine various parameters, such as coefficients, standard errors, and various other statistics, that are then stored within the memory 307, for example. In at least one embodiment, the various parameters may be stored as an electronic spreadsheet. The parameters may be used to determine adjusted X and Y position values for each cavity 206 of the grommet 200 during a component insertion process.

The control unit 306 may determine the adjusted position values (for example, X and Y components) of each cavity 206 during the component insertion process based on the mathematical model that determines the relative impact of seal plug size, wire gauge, distance from shell, grommet durometer, and/or the like. The control unit 306 may analyze each of such variables, as well as the original and shifted (measured) cavity locations, to determine the effect of a component insertion in a specific cavity area. The control unit 306 may analyze the various parameters (for example, the variable, shifted and original positions) through the mathematical model to generate a general multivariate regression equation that may then be applied on similar connector part families to determine theoretical cavity location shifts.

In at least one embodiment, the multivariate regression method may operate as follows. First, an image of an empty grommet is acquired. Next, a wire is inserted into a cavity of the grommet. A second image of the grommet with the wire is acquired. The control unit 306 determines a shift between cavities after insertion of the wire. The process repeats. The control unit 306 may define variables for all of cavities (such as location, stiffness of grommet, location of close wires and plugs, and the like). The control unit 306 may utilize a multivariate mathematical model to generate an equation that shows the relative impact of each variable. New variables for the connector configuration to be inserted are inserted into the equation output from the multivariate regression model, and an expected X,Y cavity location may then be generated.

Figures 6A, 6B:
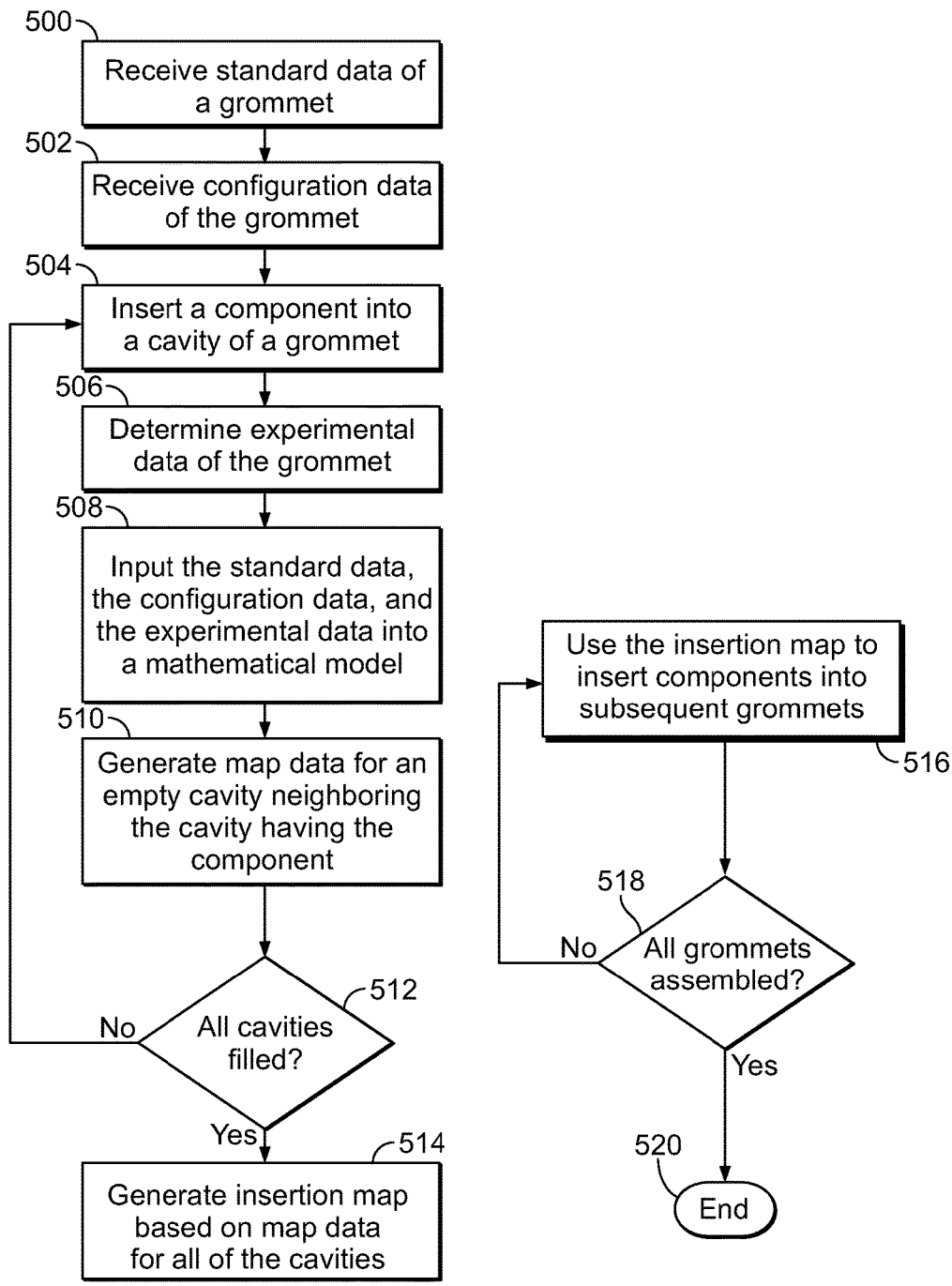
FIG. 6A illustrates a flow chart of a method of generating an insertion map for a grommet of an electrical connector, according to an embodiment of the present disclosure.
FIG. 6B illustrates a flow chart of a method of accurately inserting components into a grommet of an electrical connector, according to an embodiment of the present disclosure.

FIG. 6A illustrates a flow chart of a method of generating an insertion map for a grommet of an electrical connector, according to an embodiment of the present disclosure. Referring to FIGS. 3 and 6A, the method begins at 500 in which standard data of a grommet 200 is received. For example, the control unit 306 may receive the standard data and store it in the memory 307. The standard data may be or include information regarding one or more of the number of cavities, and/or positions thereof of the grommet 200, for example.

At 502, configuration data of the grommet 200 is received. For example, the control unit 306 may receive the configuration data and store it in the memory 307. The configuration data may include information regarding one or more of a material that forms the grommet, a durometer of the grommet, and/or sizes and locations of the cavities of the grommet, and/or the like. At least portions of 500 and 502 may occur concurrently. Optionally, 500 may occur before 502, or vice versa.

At 504, a component 260 is inserted into a cavity 206 of the grommet 200. For example, the component insertion sub-system 302 may insert the component 260 into the cavity 206.

At 506, experimental data of the grommet may be determined subsequent to component insertion. For example, the control unit 306 may analyze images of the grommet before and after component insertion to determine the experimental data, which may include distance changes between the cavities 206 of the grommet 200.

At 508, the control unit 306 inputs the standard data, the configuration data, and the experimental data into a mathematical model, such as multivariate regression model. Based on the mathematical model that considers all of the standard data, the configuration data, and the experimental data, at 510 the control unit 306 generates or otherwise outputs map data for one or more empty cavities 206 neighboring the cavity 206 having the inserted component. The map data may be separated between X and Y components of each cavity 206 with respect to an X-Y coordinate plane map of the grommet 200. For example, the map data may include X map data and Y map data. In at least one other embodiment, both the X and Y map data may be combined into unified map data.

At 512, the control unit 306 determines whether all of the cavities are filled. If all the cavities are not filled, the method returns to 504.

If, however, all of the cavities are filled, the method proceeds from 512 to 514, in which the control unit 306 complies all of the map data generated for each component insertion step, and generates an insertion map. The insertion map is based on the map data for all of the cavities.

In at least one embodiment, the control unit 306 (such as through image processing and/or using a multivariate mathematical model equation) produces coefficients related to the impact of various variables. Subsequently, the control unit 306 uses reference designator specific connector attributes with respect to the multivariate regression equation to generate the insertion map (that is, the updated insertion map).

FIG. 6B illustrates a flow chart of a method of accurately inserting components into a grommet of an electrical connector, according to an embodiment of the present disclosure. Referring to FIGS. 3 and 6B, at 516, the insertion map is used to insert components into subsequent grommets 200. At 518, it is determined whether all of the grommets are assembled. If not, the method returns to 516. If, however, all of the grommets are assembled, the method ends at 520.

The control unit 306 of FIG. 3 may be used to control operation of the method shown and described with respect to FIGS. 6A and 6B. The control unit 306 may be programmed to operate the system 250 according to the method shown and described with respect to FIGS. 6A and 6B.

Certain embodiments of the present disclosure provide a method to compensate for connector grommet shift during automated wire insertion. The method may include determining a theoretical cavity location shift on the connector grommet. The determining may include capturing an initial image of the connector grommet with no wires inserted, using a control unit (which may include an image processor) to establish an initial x-y coordinate for all the cavity locations on the connector grommet. The determining may include inserting a first wire in a first cavity (such as a substantially central cavity) of the connector grommet, taking a second image of the connector grommet, processing the second image, calculating the shift in location of a plurality of adjacent and proximate empty cavities to the cavity with the inserted wire, and comparing the percentage shift in x-y coordinates of each of the adjacent and proximate empty cavities relative to the cavity with the inserted component. The determining may also include establishing a threshold percentage shift below which a shift in coordinates is considered insignificant, and identifying the proximate empty cavity with an insignificant shift as the nth cavity from the cavity with inserted wire. The method may include calculating a cumulative x-y coordinate shift effect on the empty cavities due to the previous wire insertions, and calculating the theoretical x-y shift and corresponding x-y coordinates of each of the follow-on empty cavities for inserting follow-on wires.

Certain embodiments of the present disclosure provide a method to empirically calculate wire insertion cavities on a connector grommet for programming an automated wire insertion system. The method may include calculating an x-y coordinate shift on adjacent and proximate empty cavities proximate to a cavity having an inserted wire using parameters including planar x-y coordinate of the empty cavity, inserted wire diameter, outside diameter of the connector grommet, connector grommet housing dimensions and associated constraints on grommet expansion, and grommet material durometer. The method may include calculating an x-y coordinate shift for the empty cavity next to the wired cavity, and follow-on empty cavities, up to the empty cavity where the x-y coordinate shift is below a threshold percentage shift rendering the x-y coordinate shift insignificant, mapping a theoretical matrix of empty cavity x-y coordinates based on a wired connector grommet covering a plurality of conditions where a single wire is inserted up to where all the empty cavities of the grommet are wire inserted with one empty cavity left to have its wire inserted, uploading the empty cavity X-Y coordinate plane map matrices onto the automated wire insertion system, and enabling the automated wire insertion system to insert wires into empty cavities of the connector grommet based on empirically calculated empty cavity x-y coordinate following each wire insertion step.

Embodiments of the present disclosure provide systems and methods that significantly increase the efficiency and accuracy of an automated electrical connector assembly process. Embodiments of the present disclosure provide systems and methods that allow large amounts of data (such as the changing distances between numerous cavities of a grommet during the assembly process) to be quickly and efficiently analyzed by a computing device. The vast amounts of data are efficiently organized and/or analyzed by a grommet shift determination sub-system, as described above. The grommet shift determination sub-system analyzes the data in a relatively short time so that the data may then be used to generate an insertion map, which may then be used to efficiently and accurately insert various components into subsequent grommets. A human being would be incapable of efficiently analyzing such vast amounts of data in such a short time. As such, embodiments of the present disclosure provide increased and efficient functionality, and vastly superior performance in relation to a human being analyzing the vast amounts of data. In short, embodiments of the present disclosure provide systems and methods that analyze thousands, if not millions, of calculations and computations that a human being is incapable of quickly, efficiently, effectively and accurately managing.

As described above, embodiments of the present disclosure provide systems and methods for accurately inserting components into a grommet of an electrical connector. Embodiments of the present disclosure provide systems and methods of compensating for grommet shift during an assembly process.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An automated assembly system that is configured to automatically insert components into grommets, the automated assembly system comprising:
a component insertion sub-system configured to insert first components into first cavities of a first grommet;
an imaging sub-system configured to acquire images of the first grommet; and
a grommet shift determination sub-system in communication with the component insertion sub-system and the imaging sub-system, the grommet shift determination sub-system being configured to compare at least two images of at least portions of the first cavities of the first grommet acquired by the imaging sub-system to determine distance changes between the first cavities in response to one or more the first components being inserted into one or more of the first cavities, and generate an insertion map that accounts for the distance changes.

2. The automated assembly system of claim 1, wherein the component insertion sub-system is further configured to insert subsequent components into subsequent cavities of subsequent grommets based on the insertion map.

3. The automated assembly system of claim 1, wherein the grommet shift determination sub-system generates the insertion map by modifying an initial insertion map that indicates a desired component configuration for the first grommet.

4. The automated assembly system of claim 1, wherein the at least two images acquired by the imaging sub-system comprise an initial image of the first grommet devoid of any of the first components.

5. The automated assembly system of claim 1, wherein the grommet shift determination sub-system is further configured to compound distance changes between the first cavities in response to each of the first components being inserted into a respective one of the first cavities, and generate the insertion map based on the compounded distance changes.

6. The automated assembly system of claim 1, wherein the grommet shift determination sub-system is configured to determine the distance changes between all of the first cavities in response to each of the first components being inserted into a respective one the first cavities.

7. The automated assembly system of claim 1, wherein the grommet shift determination sub-system is configured to determine the distance changes between a subset of the first cavities in response to each of the first components being inserted into a respective one the first cavities.

8. The automated assembly system of claim 1, wherein the imaging sub-system is configured to acquire a separate image in response to each of the first components being inserted into a respective one of the first cavities, and wherein the grommet shift determination sub-system is configured to compare each of the separate images with respect to at least one other of the separate images to determine the distance changes between the first cavities in response to the first components being inserted into the first cavities.

9. The automated assembly system of claim 1, wherein the grommet shift determination sub-system is configured to generate the insertion map based on a multivariate regression model.

10. The automated assembly system of claim 1, wherein the grommet shift determination sub-system is configured to:
receive standard data regarding the first grommet and configuration data regarding the first grommet,
receive experimental data including the at least two images for each of the first cavities,
analyze the standard data the configuration data, and the experimental data to generate map data for the first cavities, and
generate the insertion map for all of the first cavities based on the map data.

11. The automated assembly system of claim 10, wherein the standard data comprises a number of first cavities, and wherein the configuration data comprises information regarding a material that forms the first grommet, a durometer of the first grommet, and sizes and locations of the first cavities.

12. A method of automatically inserting components into grommets, the method comprising:
inserting one or more first components into first cavities of a first grommet;
acquiring images of the first grommet with an imaging sub-system;
comparing at least two of the acquired images of at least portions of the first cavities of the first grommet with a grommet shift determination sub-system;
determining, via the comparing by the grommet shift determination sub-system, distance changes between the first cavities in response to the one or more of the first components being inserted into one or more of the first cavities; and
generating, using the grommet shift determination sub-system, an insertion map that accounts for the distance changes.

13. The method of claim 12, further comprising using the component insertion sub-system to insert subsequent components into subsequent cavities of subsequent grommets based on the insertion map.

14. The method of claim 12, wherein the generating comprises modifying an initial insertion map that indicates a desired component configuration for the first grommet.

15. The method of claim 12, wherein the at least two of the acquired images comprise an initial image of the first grommet devoid of any of the first components.

16. The method of claim 12, further comprising compounding distance changes between the first cavities in response to each of the first components being inserted into a respective one of the first cavities, and wherein the generating is based on the compounded distance changes.

17. The method of claim 12, wherein the determining comprises determining the distance changes between all of the first cavities in response to each of the first components being inserted into a respective one the first cavities.

18. The method of claim 12, wherein the acquiring comprises acquiring a separate image in response to each of the components being inserted into a respective one of the first cavities, and wherein the comparing comprises comparing each of the separate images with respect to at least one other of the separate images to determine the distance changes between the first cavities in response to the first components being inserted into the first cavities.

19. The method of claim 12, wherein the generating comprises generating the insertion map based on a multivariate regression model.

20. The method of claim 12, further comprising:
receiving standard data regarding the grommet and configuration data regarding the grommet;
receiving experimental data including the at least two images for each of the first cavities; and
analyzing the standard data, the configuration data, and the experimental data to generate map data for the first cavities,
wherein the generating comprises generating the insertion map for all of the first cavities based on the map data.

21. An automated assembly system that is configured to automatically insert components into grommets, the automated assembly system comprising:
a component insertion sub-system configured to insert first components into first cavities of a first grommet; and
a grommet shift determination sub-system in communication with the component insertion sub-system, the grommet shift determination sub-system being configured to compare at least two images of at least portions of the first cavities of the grommet and generate an insertion map that accounts for distance changes between the first cavities as one or more of the first components are inserted into one or more of the first cavities,
wherein the component insertion sub-system is further configured to insert subsequent components into subsequent cavities of subsequent grommets based on the insertion map.

* * * * *